(12) United States Patent
    Van Der Tempel

(10) Patent No.: US 12,607,166 B2
(45) Date of Patent: Apr. 21, 2026

(54) WIND TURBINE GENERATOR WITH HYDRAULIC PUMP

(71) Applicant: Delft Offshore Turbine B.V., Delft (NL)

(72) Inventor: Jan Van Der Tempel, Delft (NL)

(73) Assignee: Delft Offshore Turbine B.V., Delft (NL)

( * ) Notice: Subject to any disclaimer, the term of this patent is extended or adjusted under 35 U.S.C. 154(b) by 0 days.

(21) Appl. No.: 18/417,391

(22) Filed: Jan. 19, 2024

(65) Prior Publication Data

US 2024/0328389 A1     Oct. 3, 2024

Related U.S. Application Data

(63) Continuation of application No. 16/620,256, filed as application No. PCT/NL2018/050375 on Jun. 8, 2018, now abandoned.

(30) Foreign Application Priority Data

Jun. 9, 2017    (NL) ...................................... 2019045

(51) Int. Cl.
     *F03D 9/28*        (2016.01)
     *F03D 15/00*       (2016.01)
     (Continued)

(52) U.S. Cl.
     CPC ............... *F03D 9/28* (2016.05); *F03D 15/00* (2016.05); *F03D 80/88* (2016.05); *F04B 1/0426* (2013.01); *F04B 1/0439* (2013.01); *F04B 1/063* (2013.01); *F04B 9/042* (2013.01);

*F04B 17/02* (2013.01); *F05B 2230/61* (2013.01); *F05B 2230/80* (2013.01); *F05B 2240/916* (2013.01); *F05B 2260/406* (2013.01)

(58) Field of Classification Search
None
See application file for complete search history.

(56) References Cited

U.S. PATENT DOCUMENTS 1,874,010 A    8/1932   Hess
2,217,796 A    10/1940   Norman
         (Continued)

FOREIGN PATENT DOCUMENTS

DE      10146968 A1    6/2002
EP       1677006 A2 *   7/2006   ........... B66C 23/207
         (Continued)

OTHER PUBLICATIONS

Machine translation of WO-2014109043 (Obtained from USPTO Search) (Year: 2024).*

(Continued)

*Primary Examiner* — Dominick L Plakkoottam
*Assistant Examiner* — Geoffrey S Lee
(74) *Attorney, Agent, or Firm* — Pillsbury Winthrop Shaw Pittman, LLP

(57) ABSTRACT

Wind turbine, comprising a tower and a head mounted at an upper end of said tower, rotational around a head axis, wherein a propeller is mounted to said head, rotatable around a propeller axis, wherein a hydraulic pump is provided, driven by said propeller, wherein the hydraulic pump is provided substantially in the propeller.

19 Claims, 14 Drawing Sheets

(51) Int. Cl.

| | | |
|---|---|---|
| *F03D 80/80* | (2016.01) |
| *F04B 1/0426* | (2020.01) |
| *F04B 1/0439* | (2020.01) |
| *F04B 1/063* | (2020.01) |
| *F04B 9/04* | (2006.01) |
| *F04B 17/02* | (2006.01) |

(56) References Cited

U.S. PATENT DOCUMENTS

| | | | | |
|---|---|---|---|---|
| 2,431,175 A * | 11/1947 | Hoffer | F04B 1/0456 | 92/160 |
| 2,496,915 A | 2/1950 | Hoffer | | |
| 2,697,403 A | 12/1954 | Benedek | | |
| 3,123,013 A | 3/1964 | Ganahl | | |
| 3,320,898 A | 5/1967 | Eickmann | | |
| 3,570,372 A * | 3/1971 | Campbell | F04B 1/053 | 91/496 |
| 4,311,434 A | 1/1982 | Abe | | |
| 5,190,447 A * | 3/1993 | Schneider | F04B 17/03 | 417/270 |
| 7,569,943 B2 * | 8/2009 | Kovach | H02J 3/381 | 290/55 |
| 8,016,716 B2 * | 9/2011 | de Ugarte | F03D 15/00 | 475/331 |
| 8,074,450 B2 | 12/2011 | Nies | | |
| 8,358,024 B2 | 1/2013 | Tsutsumi | | |
| 8,622,719 B2 | 1/2014 | Tsutsumi et al. | | |
| 2004/0156733 A1 | 8/2004 | Spinnler | | |
| 2007/0132247 A1 * | 6/2007 | Galayda | F03D 9/17 | 290/44 |
| 2008/0257844 A1 | 10/2008 | Gonzalez et al. | | |
| 2009/0123304 A1 | 5/2009 | Alaze | | |
| 2011/0094987 A1 * | 4/2011 | Botwright | B66C 23/62 | 212/270 |
| 2011/0142596 A1 | 6/2011 | Nies | | |
| 2011/0268596 A1 | 11/2011 | Hansen | | |
| 2012/0060685 A1 * | 3/2012 | Salter | F03D 80/88 | 92/128 |
| 2012/0260765 A1 * | 10/2012 | Fox | F04B 1/04 | 74/567 |
| 2012/0260795 A1 * | 10/2012 | Rampen | F01B 1/062 | 91/218 |
| 2012/0297972 A1 * | 11/2012 | Allart | F04B 1/0472 | 92/147 |
| 2013/0022482 A1 * | 1/2013 | Schober | F04B 1/0417 | 384/447 |
| 2013/0045110 A1 * | 2/2013 | Wagner | F03D 13/20 | 416/244 R |
| 2013/0098239 A1 | 4/2013 | Rodrigues | | |
| 2014/0044554 A1 * | 2/2014 | Lafferty | E02D 27/42 | 29/889 |
| 2014/0086733 A1 | 3/2014 | Choi | | |
| 2015/0354537 A1 | 12/2015 | Mukai | | |
| 2015/0354607 A1 | 12/2015 | Avni | | |
| 2016/0369778 A1 * | 12/2016 | Davis | E04H 12/342 |
| 2020/0018287 A1 * | 1/2020 | Fynbo | F03D 13/10 |
| 2020/0080541 A1 * | 3/2020 | Bourgault | F04B 1/0421 |
| 2022/0018366 A1 | 1/2022 | Kline | | |

FOREIGN PATENT DOCUMENTS

| | | | | |
|---|---|---|---|---|
| EP | 2584192 A1 | 4/2013 | | |
| EP | 2889475 A1 | 7/2015 | | |
| JP | 2001-041146 | 2/2001 | | |
| JP | 2001-041146 A | 2/2001 | | |
| JP | WO-2014109043 * | 7/2014 | | |
| JP | 2015-127514 A | 7/2015 | | |
| RU | 2523706 C1 | 7/2014 | | |
| WO | 2008/084971 A1 | 7/2008 | | |
| WO | 2009/064264 A1 | 5/2009 | | |
| WO | 2011/073467 A1 | 6/2011 | | |
| WO | WO-2011148653 A2 * | 12/2011 | | F03B 13/26 |
| WO | 2014/109043 | 7/2014 | | |
| WO | WO-2014109043 A1 * | 7/2014 | | F03D 15/00 |

OTHER PUBLICATIONS

Written Opinion of the ISA in PCT/NL2018/050375.*

Lift. Merriam-Webster.com Dictionary, Merriam-Webster, https://www.merriam-webster.com/dictionary/lift. Accessed Jan. 21, 2025. ( Year: 2025).*

Ship. Merriam-Webster.com Dictionary, Merriam-Webster, https://www.merriam-webster.com/dictionary/ship. Accessed Jan. 21, 2025. (Year: 2025).*

American Heritage Dictionary, Entry "bogie" (obtained from http://web.archive.org Nov. 2022) (Year: 2015).

Machine Translation of WO 2014/09043 (obtained from USPTO Search Copyright 2023 Clarivate Analytics) (Year: 2023).

Notice of Reasons for Refusal dated Jun. 6, 2022, issued in corresponding Japanese Patent Application No. 2020-518387, with English translation (9 pgs.).

International Preliminary Report on Patentability dated Sep. 27, 2019 issued in corresponding International Patent Application No. PCT/NL2018/050375 (14 pgs.).

International Search Report dated Aug. 23, 2018 issued in corresponding International Patent Application No. PCT/NL2018/050375 (5 pgs.).

Written Opinion of the International Searching Authority dated Aug. 23, 2018 issued in corresponding International Patent Application No. PCT/NL2018/050375 (7 pgs.).

Machine Translation of WO-2014/109043 (obtained from USPTO Search, Clarivate Analytics, Copyright 2022) (Year: 2022).

\* cited by examiner

Fig. 3
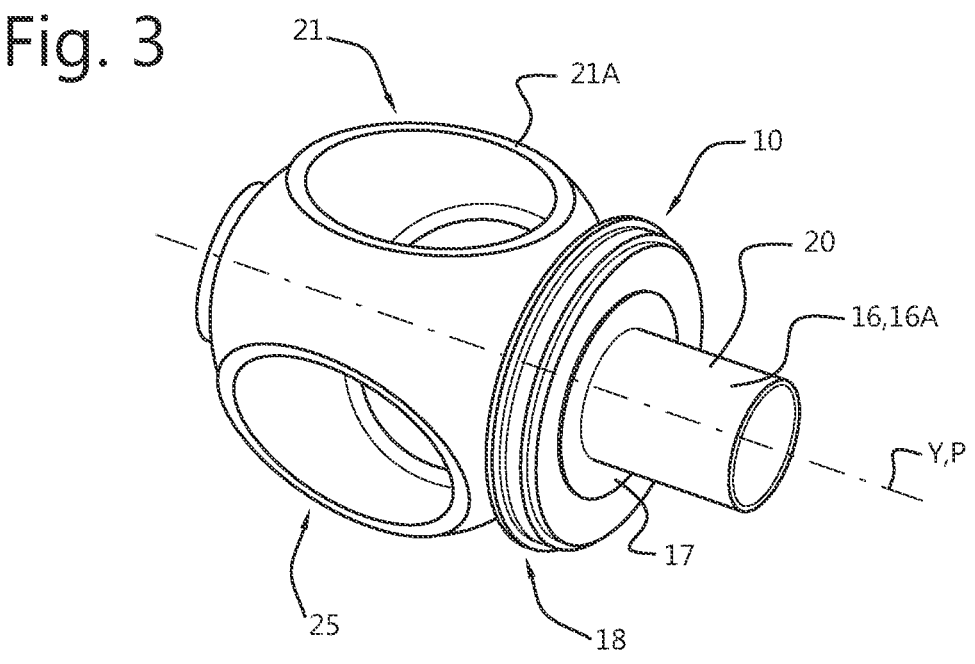
Fig. 4
Fig. 5
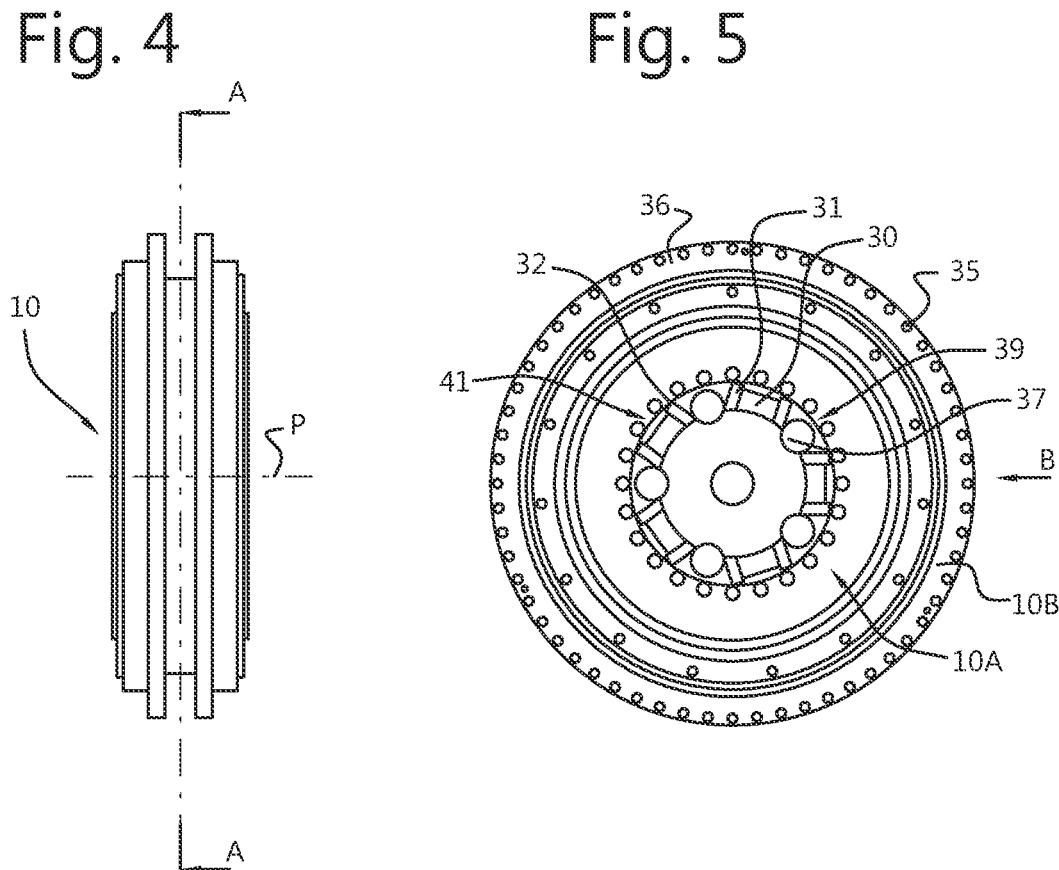

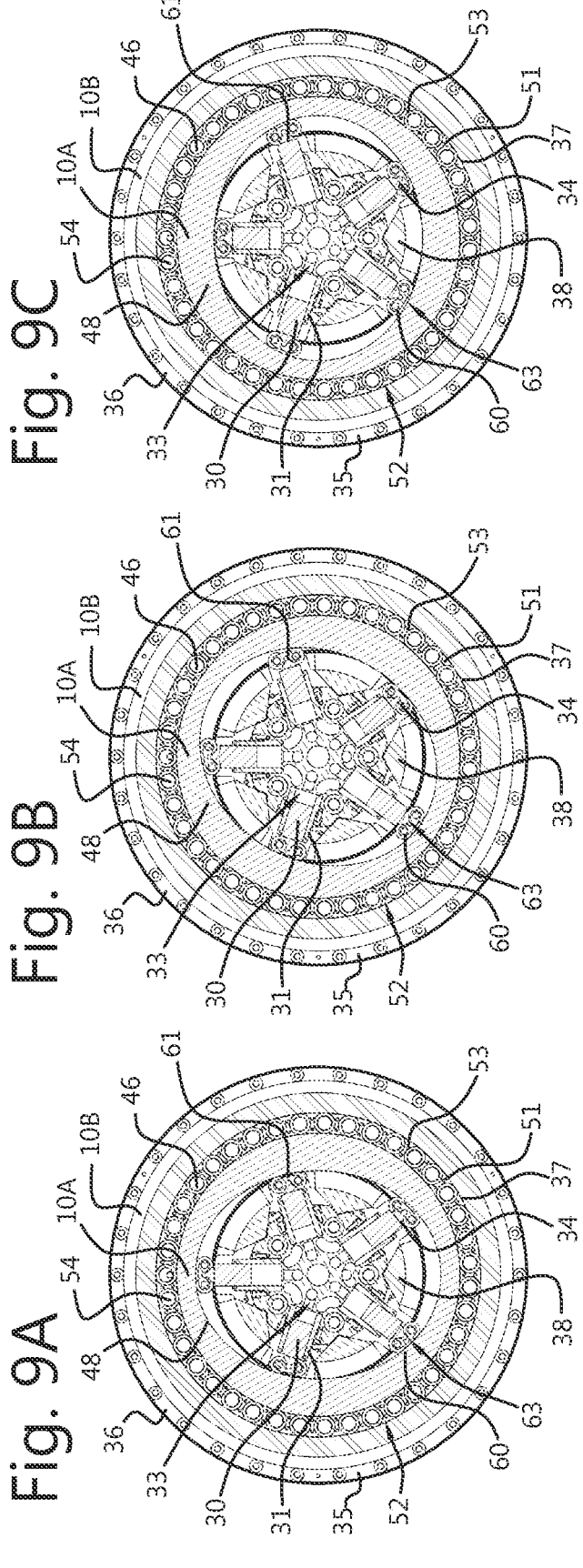

WIND TURBINE GENERATOR WITH HYDRAULIC PUMP

CROSS-REFERENCE TO RELATED APPLICATIONS

This application claims priority to U.S. application Ser. No. 16/620,256, filed Dec. 6, 2019, which is a national stage entry of PCT/NL2018/050375, filed Jun. 8, 2018, which claims priority to: Netherlands Application No. 2019045, filed Jun. 9, 2017, the entire contents of all of which are herein incorporated by reference in their entireties.

The invention relates to a wind turbine construction comprising at least a hydraulic pump construction driven or at least drivable by wind through at least one propeller.

Wind turbines using hydraulic pumps instead of electrical generators mounted in the head or nacelle of the wind turbine are well known in the art.

U.S. Pat. No. 8,622,719 discloses a wind turbine generator in which a radial-piston pump is provided in the head or nacelle of the wind turbine, connected to a hydraulic motor, which in turn is connected to an electrical generator. A propeller with a central hub is connected to the head through a central axis which drives the hydraulic pump inside the housing of the head. The pump is used for pumping oil. US2014/0086733 discloses a similar system.

From the prior art also wind turbines are known provided with other types of hydraulic pumps, such as centrifugal or radial pumps or axial pumps. In these known systems too the pump is provided either in the head, driven by a shaft of the propeller extending into the housing of the head, or near a bottom or foot of the tower, driven by the shaft of the propeller through a system of shafts and gearings extending through the head and tower.

An aim of the present disclosure is to provide an alternative construction for a wind turbine comprising a hydraulic pump. An aim of the present disclosure is to provide for a wind turbine having a hydraulic pump which is relatively easy to build and/or maintain, especially service. An aim of the present disclosure is to provide for a wind turbine having a hydraulic pump, which allows for relatively easy service of the hydraulic pump or parts thereof. An aim of the present disclosure is to provide for a system comprising a wind turbine having a hydraulic pump, which is low maintenance and requires short down time for service. The disclosure further aims and provides methods and systems for installing and/or maintenance of wind turbines and wind farms using hydraulic pumps.

At least one or some of these and other aims can be obtained with a wind turbine, system and/or method according to the disclosure.

In a first aspect a wind turbine according to the disclosure comprises a tower and a head mounted at an upper end of said tower, rotational around a head axis, wherein a propeller is mounted to said head, rotatable around a propeller axis. The propeller axis may be a physical axis or a virtual axis. A hydraulic pump is provided, driven by said propeller. According to the disclosure the hydraulic pump is provided substantially in or on the propeller.

In this disclosure a hydraulic pump should be understood as meaning at least a pump for pumping fluids, such as water, for example fresh or salt water, for example sea water, through a fluid circuit. Such pump can for example be connected to a further hydraulic pump or engine, or form part thereof. Such further pump or engine can for example be an engine or generator, for example for generating electrical current and/or heat and/or cooling. A hydraulic pump of the present disclosure can also be connected to other plants, such as industrial plants, accumulators for water or other pressurized fluid operator systems.

In this disclosure providing a pump substantially in or on a propeller should be understood as meaning that at least a substantial part of the pump is mounted to move with the propeller and rotating around the said propeller axis during use. A further part of the pump may be provided in the head or nacelle of the wind turbine. The part mounted in or on the propeller can preferably be placed on and be removed from the housing or nacelle with the propeller or at least with the hub of the propeller.

In embodiments the pump may comprise a series of cylinders mounted on or formed in a nave or axis extending from the head or nacelle. The cylinders have a central axis extending outward from the nave or axis, preferably substantially radially and are open at a side facing outward. In each cylinder extends a piston having a head facing a bottom of the relevant cylinder and a foot portion facing outward, extending out of the relevant cylinder. A drive ring is mounted around the foot portions of the pistons, which drive ring has a central opening which has a non-circular cross section, such that upon rotation of said drive ring around the nave or axis, pistons are forced into, preferably into and out of the respective cylinders.

In embodiments at least a flexible lining ring or lining ring assembly is mounted between said drive ring and the foot portions of the pistons, such that upon rotation of the drive ring the lining ring is flexed driving the pistons into the respective cylinders.

In embodiments bearings are provided between said drive ring and the foot portions of the pistons, such that upon rotation of the drive ring the bearings force the pistons into the respective cylinders.

In preferred embodiments the cylinders are mounted having their open ends on a circle extending symmetrically around the said nave or axis, such that the pistons can all move between first end positions furthest from the nave or axis and second end positions closest to the nave or axis, the first end positions being at equal distances from the axis or nave and the second end positions being at equal distances from the nave or axis.

In embodiments the drive ring can have a central opening which has an undulating inner surface, such that upon rotation of the drive ring alternatingly a top and a valley of said surface will engage a foot portion of a piston, directly or indirectly, for example through roller bearings or a lining ring or ring assembly. In embodiments the drive ring can have a central opening having a smooth, substantially elliptical surface for engaging the foot portions directly or indirectly, for example through roller bearings or a lining ring or ring assembly. In embodiments the drive ring can be provided with a central opening defining a peripheral surface facing the pistons, rollers being provided in or on said surface for engaging the foot portions of said pistons, directly or indirectly, for example through a flexible liner or liner assembly.

In embodiments each cylinder at a bottom end is provided with at least a fluid inlet and a fluid outlet, coupled to a fluid inlet line and a fluid outlet line respectively, which can extend through the nave or axis into the housing. Preferably at least one of the inlet and the outlet is provided with a one way valve, such that upon outward movement of the piston in the relevant cylinder fluid is entered through the inlet into the cylinder and upon inward movement of the piston said fluid is forced out through the outlet.

In alternative embodiments the pump can be designed as an axial pump, wherein preferably a stator of said pump is connected to or formed by the nave or axis, and the rotor is provided in or by a hub of the propeller.

In alternative embodiments the pump is provided with a planetary traction or friction drive.

In embodiments a pump, for example for use in a wind turbine as described, can comprise a non-circular drive for radially extending pistons and/or cylinders, directly or indirectly engaging said pistons and/or cylinders, whereas a traction and/or friction drive may be provided, engaging said non-circular drive and a hub of a propeller, or a part engaging such hub, such as for example a further ring, forming a gearing between the hub or at least the propeller and the drive ring.

In embodiments a wind turbine according to the disclosure can comprise a crane mounted on the head or provided by the head, with which the propeller can be lifted. Preferably the propeller can be lifted with the crane from the head to a position near a foot of the tower or vice versa. The crane is preferably provided on the head, especially on a top side of said head. In embodiments the crane can be designed for lifting the propeller with a substantial part of the hydraulic pump, especially the part of the pump mounted in or on the propeller.

In embodiments the propeller with the part of the pump mounted in or on the propeller can be replaced by a replacement propeller, such that the maintenance can be performed on the propeller removed without the necessity of prolonged interruption of operation of the turbine.

In further elaboration, a wind turbine according to the disclosure, especially the hydraulic pump thereof, is connected to a generator. The hydraulic pump may be connected to a generator through a hydraulic motor or hydro turbine, for example through a Pelton type hydro turbine.

In a further aspect the disclosure is directed to a system for installation and/or maintenance of a wind turbine, especially a wind turbine according to the disclosure. The system comprises at least one vessel provided with a movable, preferably motion compensating platform suitable for carrying a propeller system of a wind turbine. The platform is further suitable for transferring personnel to and from a wind turbine to which the propeller system is to be mounted or from which the propeller system is to be retrieved.

In a further aspect the disclosure is directed to a method for installing and/or maintenance of a wind turbine. In such method a tower with a head can be placed in a selected position, and a propeller system is shipped to said tower, the propeller system including at least a substantial part of a hydraulic pump. The propeller system is lifted to the head such that the hydraulic pump can assembled in the turbine and/or can be connected to a hydraulic circuit extending through the tower and the head. The propeller system is connected to the head.

In embodiments a method according to the disclosure can be designed for maintenance of a wind turbine farm, comprising a series of wind turbines, preferably according to disclosure, wherein the series of turbines comprises N turbines, each turbine comprising a propeller system. At least one further propeller system is provided for exchange with any one of the N propeller systems. For maintenance of a propeller system the propeller system is removed from a wind turbine and replaced by said further propeller system, wherein the propeller system removed may be shipped to a maintenance location remote from the relevant wind turbine or farm or maintenance may be performed on location.

In the present disclosure wind turbines are disclosed both for off shore or on shore installation. Preferably wind turbines according to the disclosure are used off shore, wherein water, especially sea water is used as fluid pumped by the hydraulic pump.

In order to further elucidate the present invention, embodiments thereof shall be disclosed and discussed hereafter, with reference to the drawings. Therein shows schematically:

FIG. 3 illustrates a hub of a propeller with a shaft or axis, and a hydraulic pump mounted to the hub;

FIG. 4 illustrates a hydraulic motor according to the disclosure, in side view;

FIG. 5 illustrates a hydraulic motor according to FIG. 4, in front view;

Figure 8:
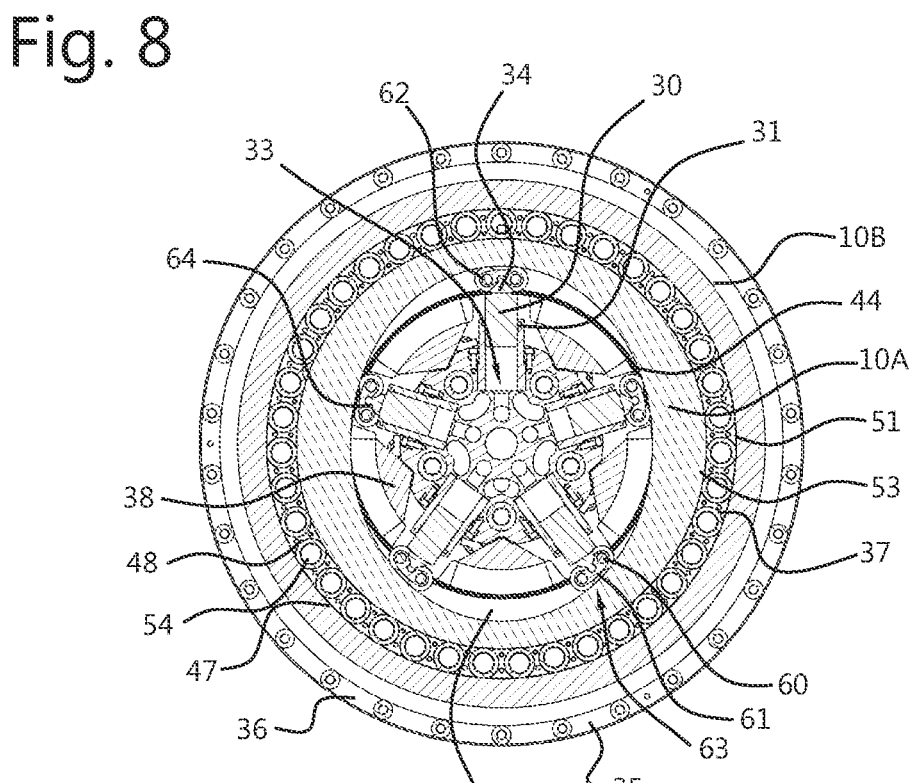
FIG. 8 illustrates an alternative embodiment of a hydraulic pump, in cross sectional side view along line A-A in FIG. 4.
Figure 10:
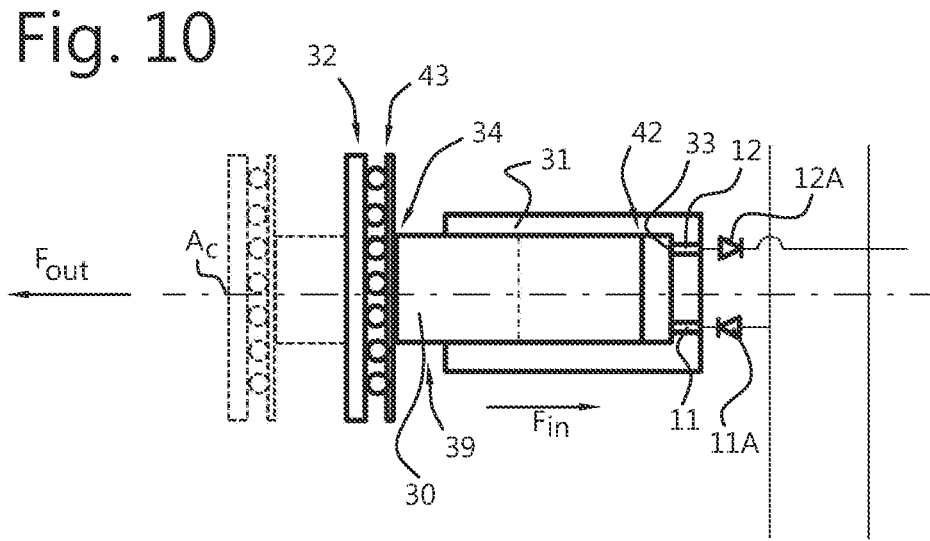
Figure 11:
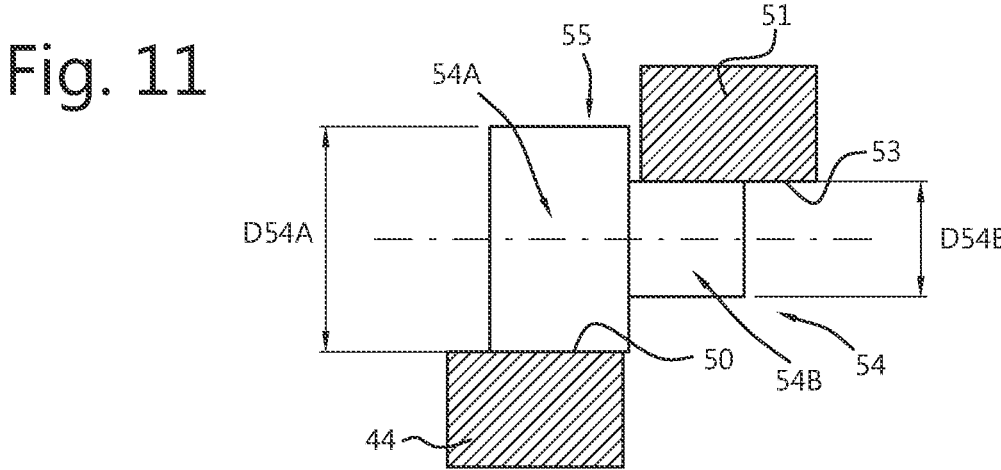
Figure 12:
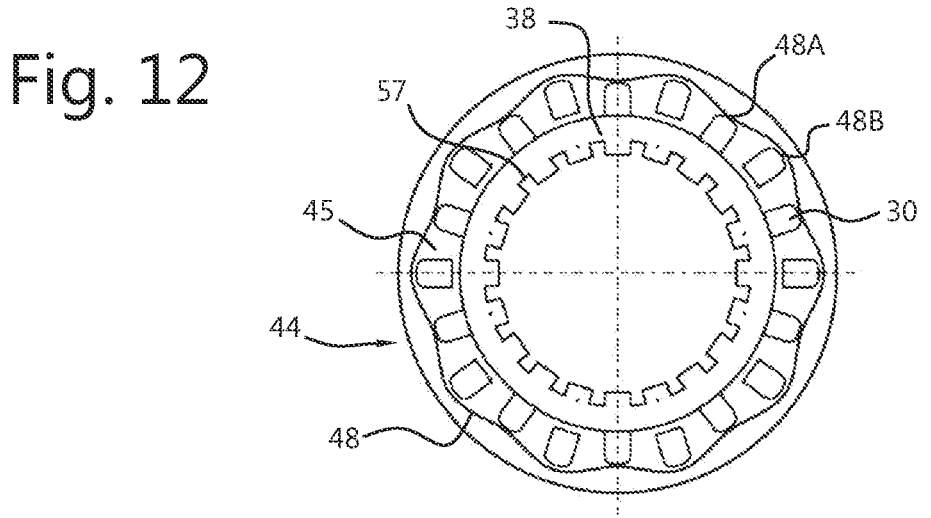
Figure 12A:
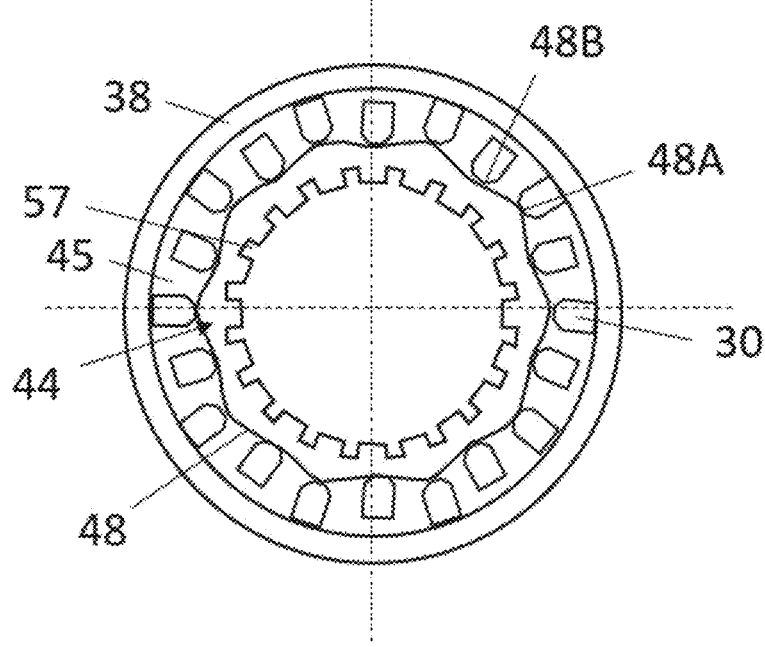
Figure 13:
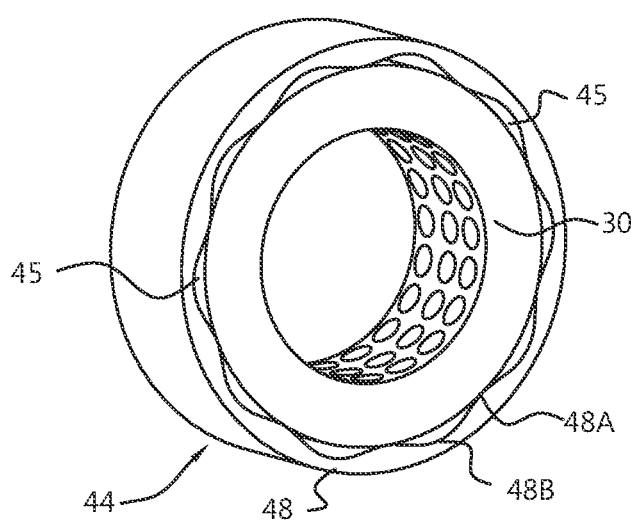
Figure 14:
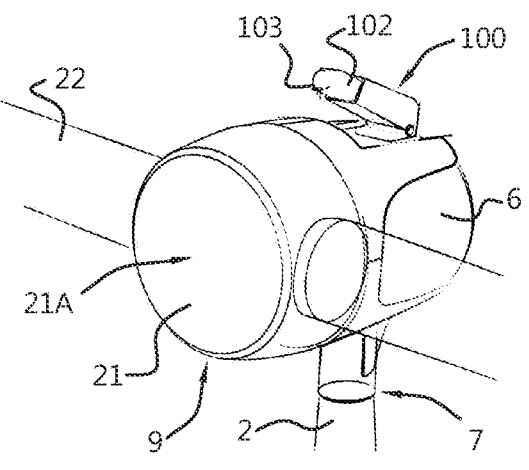
Figure 15:
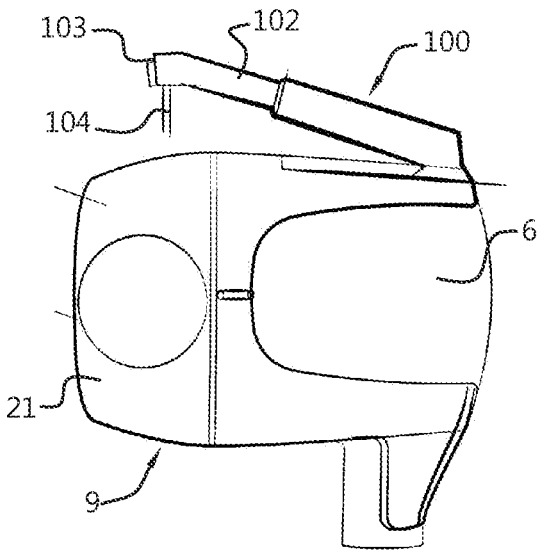
Figure 17:
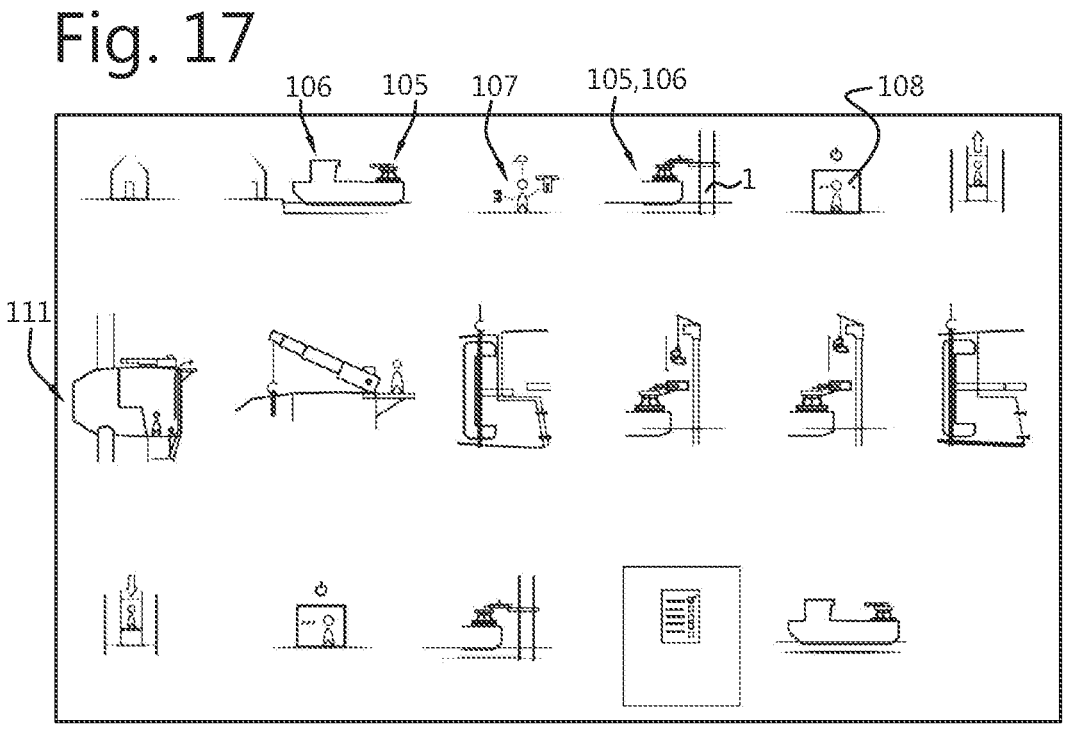
Figure 18:
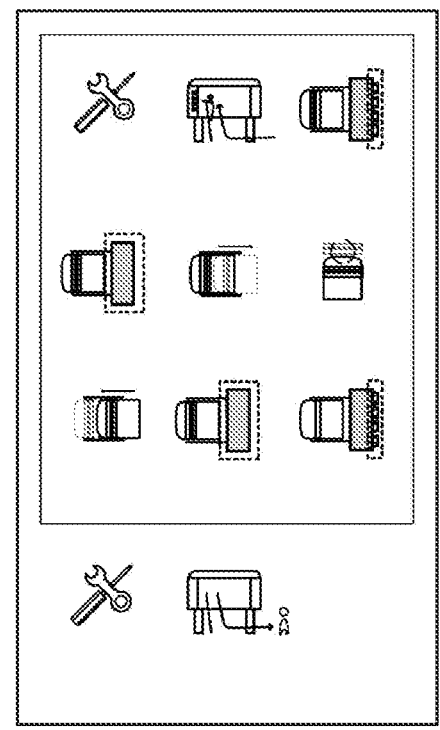
Figure 21:
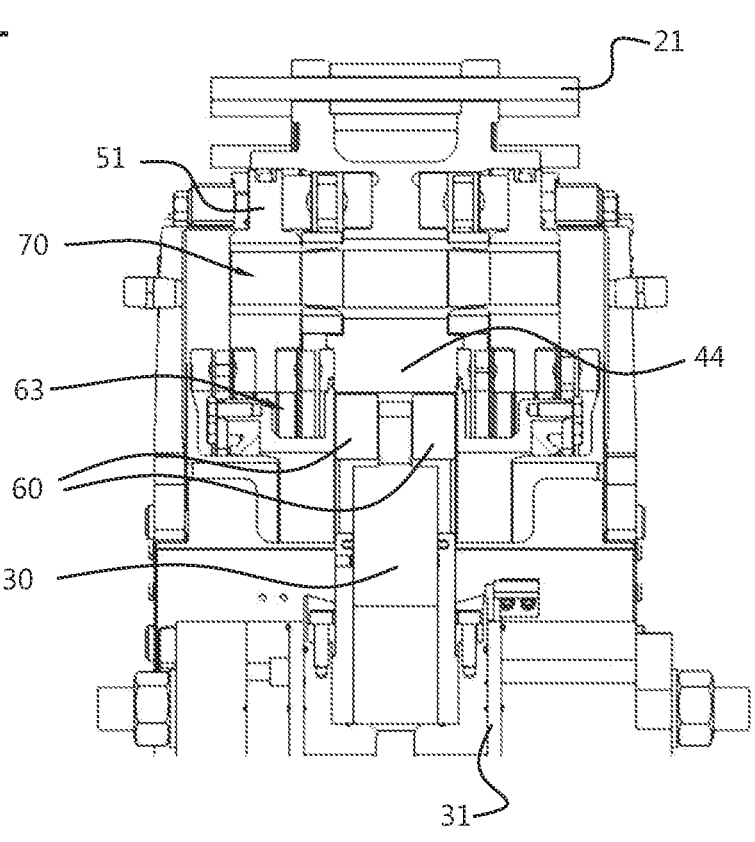
Figure 22:
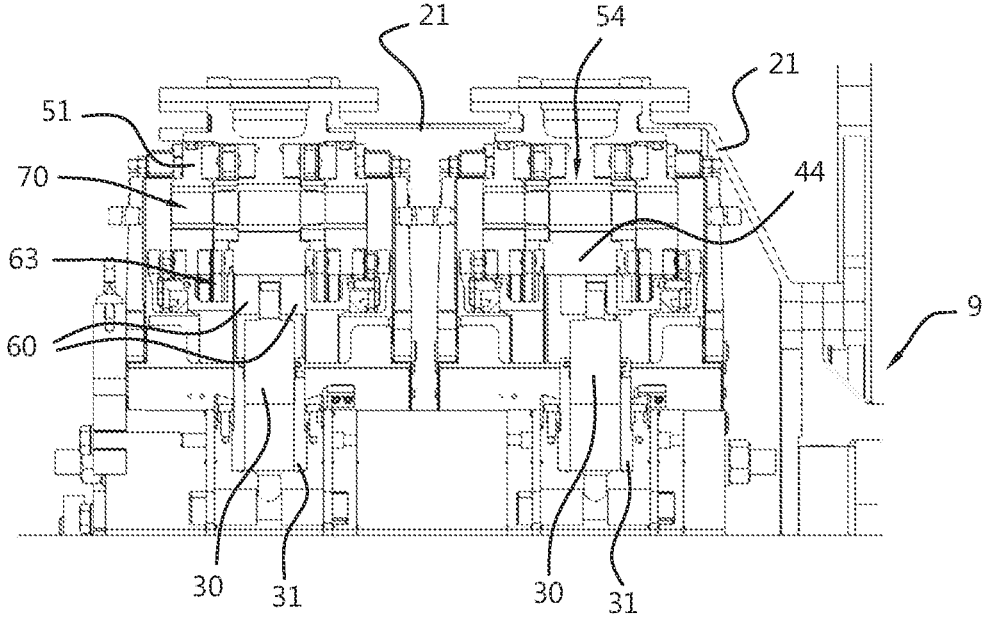

FIGS. 9A, B and C illustrate three positions of a pump according to the disclosure, especially according to FIG. 8, wherein a drive ring in FIG. 9B has been rotated over 30 degrees relative to its position in FIG. 9A and in FIG. 9C over 90 degrees relative to the position of FIG. 9A;

FIG. 10 illustrates a piston in a cylinder, connected to an inlet line and an outlet line for fluid, with part of a drive system for the pistons, wherein two positions are shown from the piston in the cylinder;

FIG. 11 illustrates a transmission between two drive elements in a hydraulic pump;

FIG. 12 illustrates schematically part of a hydraulic pump;

FIG. 12A illustrates schematically parts of an alternate hydraulic pump;

FIG. 13 illustrates a hydraulic pump with multiple rows of cylinders and pistons;

FIG. 14 illustrates in perspective view part of a wind turbine, with a crane;

FIG. 15 illustrates in side view part of a wind turbine according to FIG. 14;

Figure 16:
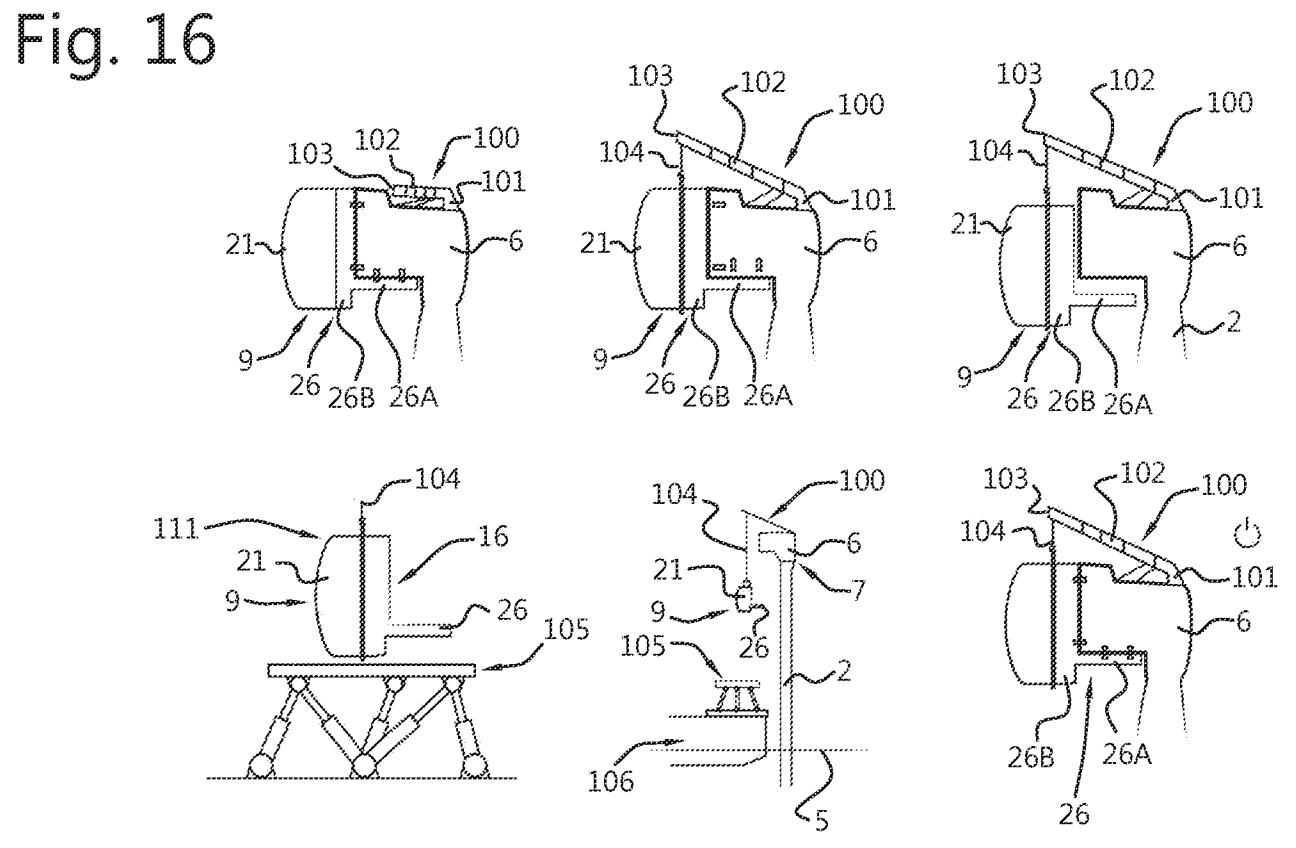

FIG. 16 illustrates different steps in a method for mounting, dismounting and/or repair of a propeller of a wind turbine and/or a hydraulic pump or part thereof;

FIG. 17 illustrates steps in propeller and/or pump repair and/or maintenance including dismounting a propeller;

FIG. 18 illustrates steps in pump maintenance and/or repair from within a head of a wind turbine;

Figures 19, 20:
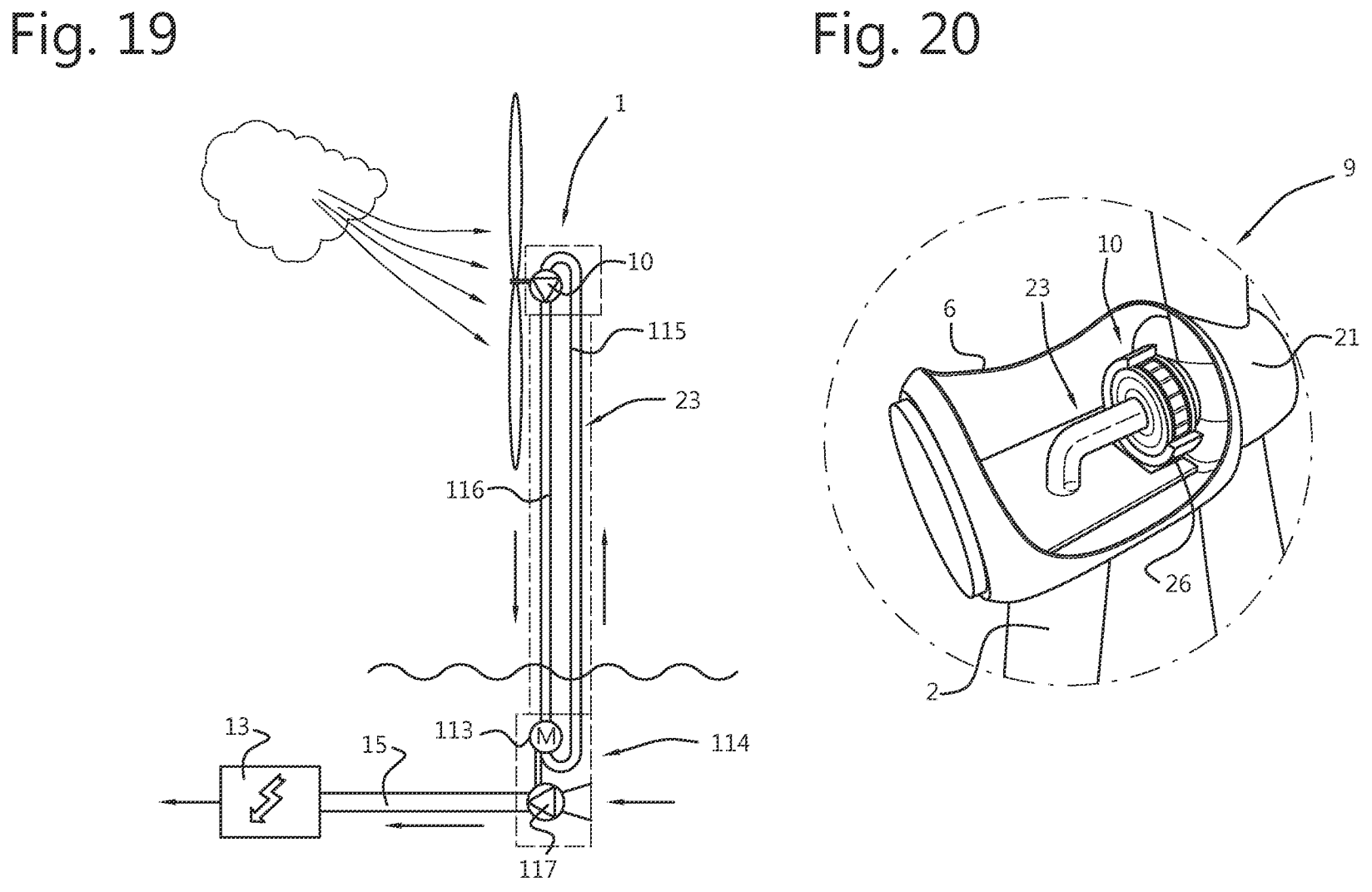

FIG. 19 illustrates in cross sectional side view a wind turbine connected to a generator;

FIG. 20 illustrates in perspective view a partially broken away head of a wind turbine with a pump;

FIG. 21 illustrates in cross sectional side view part of a pump according to FIGS. 8 and 9, in a single row embodiment; and FIG. 22 illustrates in cross sectional side view part of a pump according to FIGS. 8 and 9, in a double row embodiment, with part of a propeller shown.

In this description embodiments are shown and disclosed of the invention, by way of example only. These should by no means be interpreted or understood as limiting the scope of the present invention in any way. In this description the same or similar elements are indicated by the same or similar reference signs. In this description embodiments of the present invention shall be discussed with reference to sea water as fluid to be pumped. However, other fluids could also be used in the present invention.

In this description references to above and below, top and bottom and the like shall be considered, unless specifically stipulated differently, to a normal orientation of a wind turbine. This is for example shown in the drawings, especially FIG. 1, wherein top, bottom, up and down are indicated by arrows and appropriate wording, for indicative purposes only. This does not necessarily reflect the orientation in which a turbine of the present disclosure or parts thereof have to be used.

In the drawings by way of example a wind turbine is shown having a propeller with two or three blades, extending in opposite directions from a hub. It shall however be clear that any number of blades could be provided in a propeller of the present disclosure, as is known in the art.

In the drawings by way of example a wind turbine is shown in which water is drawn from a body of water, especially a lake or sea, and is pumped up through the tower by the hydraulic pump, and down again to a generator. The fluid circuit including the hydraulic pump in the turbine may be an open or closed circuit, and may comprise other fluids, especially in a closed circuit. Alternatively the hydraulic pump may be connected to a generator in the head of the turbine. Alternatively the hydraulic pump may be used for pumping water, such as sea water, into a storage facility, such that said water can upon demand be used for powering a generator connected to said storage facility.

Figures 1, 2:
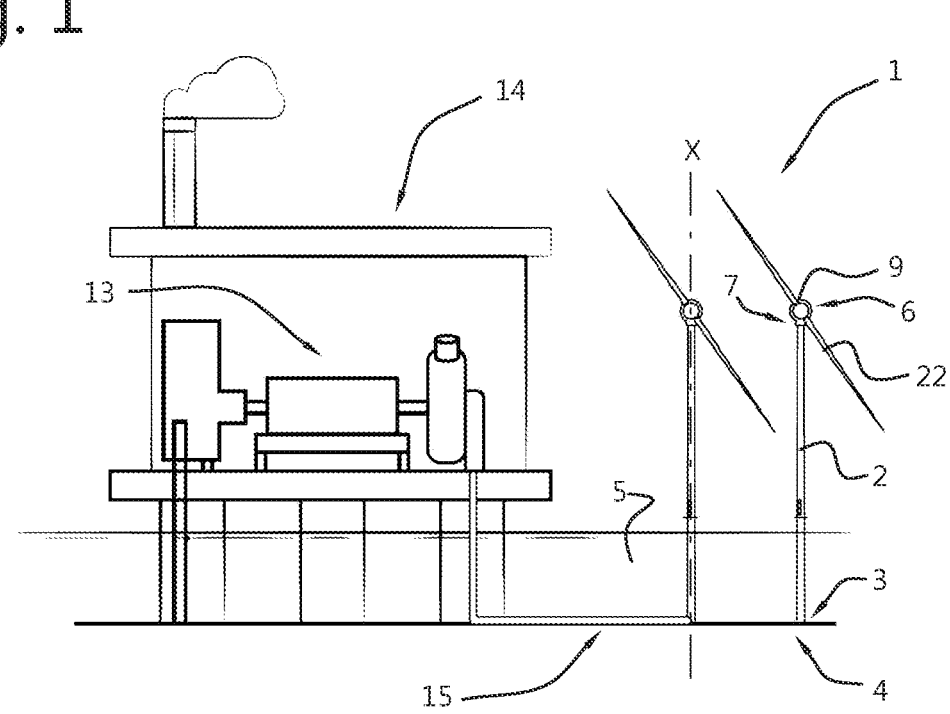
FIG. 1 illustrates a number of wind turbines, connected to a plant.
FIG. 2 illustrates in cross section part of a turbine, showing a hydraulic pump.

FIG. 1 shows schematically a series of wind turbines 1, in this embodiment shown as off shore installed wind turbines, i.e. wind turbines 1 having a tower 2 placed on a foundation 3 positioned at the bottom 4 of open water 5, for example a sea or ocean. Each wind turbine 1 has a head 6 mounted on a top end 7 of the tower 2, which head or nacelle 6 can rotate around a substantially vertical axis X of the tower 2. At one end 8 of the head a propeller 9 is provided, mounted such that it can rotate around a propeller axis Y extending substantially horizontally, substantially perpendicular to the longitudinal axis X of the tower 2. Appropriate bearings and gearing are provided between the tower 2 and the head 6, as known in the art, for allowing controlled positioning of the head relative to a prevailing wind direction.

In the wind turbine 1 a hydraulic pump 10 is provided, driven by the propeller 9, as for example shown in FIG. 2. The hydraulic pump 10 is connected to an inlet line 11 and an outlet line 12, as for example schematically shown in FIGS. 10 and 19, for fluid to be pumped. In the embodiment shown in FIG. 1 for example water can be pumped up from the body of water 5, through the inlet line 11, and be pumped out through the outlet line extending down through the tower 2 and towards a destination for the fluid. In FIG. 1 by way of example such destination is shown as a generator 13 provided in a plant 14, as will be discussed. Water is pumped from the tower 2 at relatively high pressure through a pipeline 15 to the generator 13 for driving the generator 13 and generating electrical power.

In embodiments of the present invention the turbine 1 comprises a tower 2 and a head 6 mounted at an upper end 7 of said tower 2, rotational around a head axis X, wherein a propeller 9 is mounted to said head 6, rotatable around a propeller axis Y, wherein the hydraulic pump 10 is provided, driven by said propeller 9. The hydraulic pump 10 is provided substantially in the propeller 9. In embodiments the head 6 can comprise a nave 16, wherein the pump rotates with the propeller 9 at least partly around a part of said nave 16 extending from said head 6. The nave 16 can form or can be provided with a substantially stationary part 17 of the hydraulic pump 10, and wherein the propeller 9 comprises a rotational part 18 of the hydraulic pump 10. In such embodiments, as for example shown in FIGS. 2 and 3, the nave 16 can comprise a first part 19 inside said head 6 and a second part 20 which is releasably connected to said first part 19. Said second part 20 can then be provided in or by said hydraulic pump 10, extending into the propeller 9.

In embodiments the propeller 9 comprises a hub 21, as for example shown in FIGS. 2 and 3, from which the blades 22 of the propeller 9 extend. As can be seen in FIG. 3 a second part 20 of the nave 16 can extend from the hub 21, wherein the hub 21 can rotate around said second part 20. The pump 10 is connected to the hub 21, and to the second part 20, such that a rotation of the hub 21 relative to the second part 20 will lead to pumping by the hydraulic pump 10. The hub 21 can further be geared and supported relative to the head 6 in a known manner, for example by appropriate bearings (not shown) between a surface 25 of the hub 21 facing the head 6 and an adjacent surface of the head 6. As is shown in FIG. 3 the hub 21 can be formed such that for example the pump 10 is placed directly beyond a main body 21A of the hub 21, for example on or over a nave 16, 16A, which should still be considered as at least substantially in the propeller 9 or in the hub 21.

A fluid circuit 23 comprising the inlet line 11 and the outlet line 12 extends through the tower 2 and the head 6, which fluid circuit 23 comprises a part 24 extending inside a hub 21 of the propeller 9. Said part 24 comprises at least part of the hydraulic pump 10.

In embodiments of the present invention the hydraulic pump 10 is provided in the hub 21 of the propeller 9, such that the pump 10 can be removed from the head 6 together with the propeller 9. To this end for example the inlet line 11 and the outlet line 12 have to be disconnected from the circuit 23, and the connection between the first and second part of the nave 19, 20 has to be disconnected, after which the propeller 9 can be removed with the hub 21 and pump 10, including the second part 20 of the nave 16. In this respect a nave 16 has to be understood as a construction or assembly of elements such as first and second parts 19, 20, which are stationary relative to the head 6 during use, and which support the pump 10 as well as part of the circuit 23.

Additionally or alternatively the pump 10 can comprise a mounting part 26 which can be fixed removably in a stationary position relative to a nave 16 in or extending from the head 6, or which can be connected to the head 6, for mounting the pump. In such embodiment for removing the pump 10 the mounting part is released, as schematically shown in FIG. 10. In embodiments as shown in FIG. 10 the pump 10 may have an inner part 10A stationary fixed on a platform or carrier or such mounting part 26, which can for example be bolted or otherwise be fixed to the head 6 in a stationary position. The hub 21 with a moving assembly 10B of the pump 10 is supported by the said mounting part 26, such that it can rotate around the propeller axis Y, around said stationary part 10A. In such embodiment releasing the mounting part 26 from the head 6 and disconnecting the circuitry 23 from the pump 10 will allow removal of the propeller 9 with the pump 10 from the head 6.

At least one valve 27 may be provided in the circuitry 23 for closing the circuitry 23 when removing the pump 10.

By allowing the pump 10 to be placed in and/or removed from the turbine 1, especially to and/or from the head 6, with the propeller 9 or at least with the hub 21 makes it very easily possible to assemble and, especially, provide maintenance to the turbine 1, without a prolonged period of non operation or down time, and hence improve efficiency of the turbine. Moreover it makes for a very practical and inexpensive system and method for construction, maintenance and/or repair.

As is for example schematically shown in FIG. 2 in cross section, the hydraulic pump 10 can comprise a series of pistons 30 movable in cylinders 31. The cylinders 31 can for example be mounted stationary relative to the nave 16 and/or mounting part 26, the pistons 30 being pushed into and allowed to move out of said cylinders 31 by a rotation of the propeller 9, especially the hub 21 around said axis Y. Inlet 11 and outlet 12 can be connected to the cylinders 31, as for example schematically shown in FIG. 10, such that when a piston 30 is pushed into the cylinder 31 by an operating or drive mechanism 32, as will be discussed, in the direction $F_{in}$ as indicated, towards a bottom end 33 of the cylinder 31, fluid such as water is forced out of the cylinder 31 through the outlet 12, whereas when the piston 30 moves in opposite direction $F_{out}$, liquid is drawn into the cylinder through the inlet 11. Appropriate one way valves 11A, 12A may be provided in the inlet 11 and outlet 12 respectively. A single row of cylinders 31 and pistons 30 can be provided, or multiple rows, as can be seen in for example FIGS. 2 and 11. By providing multiple rows relatively small cylinders can be used, nevertheless providing for a relatively large volume of liquid to be pumped.

In embodiments an end 34 of each piston 30 can be connected to the drive mechanism 32, such that the piston 30 can be pushed in the direction $F_{in}$ as well as pulled in the direction $F_{out}$. Additionally or alternatively the fluid can be pressurized in the inlet line 11 slightly, such that it is forced into the cylinder through an inlet 11 pushing the piston 30 in the direction $F_{out}$.

Figure 6:
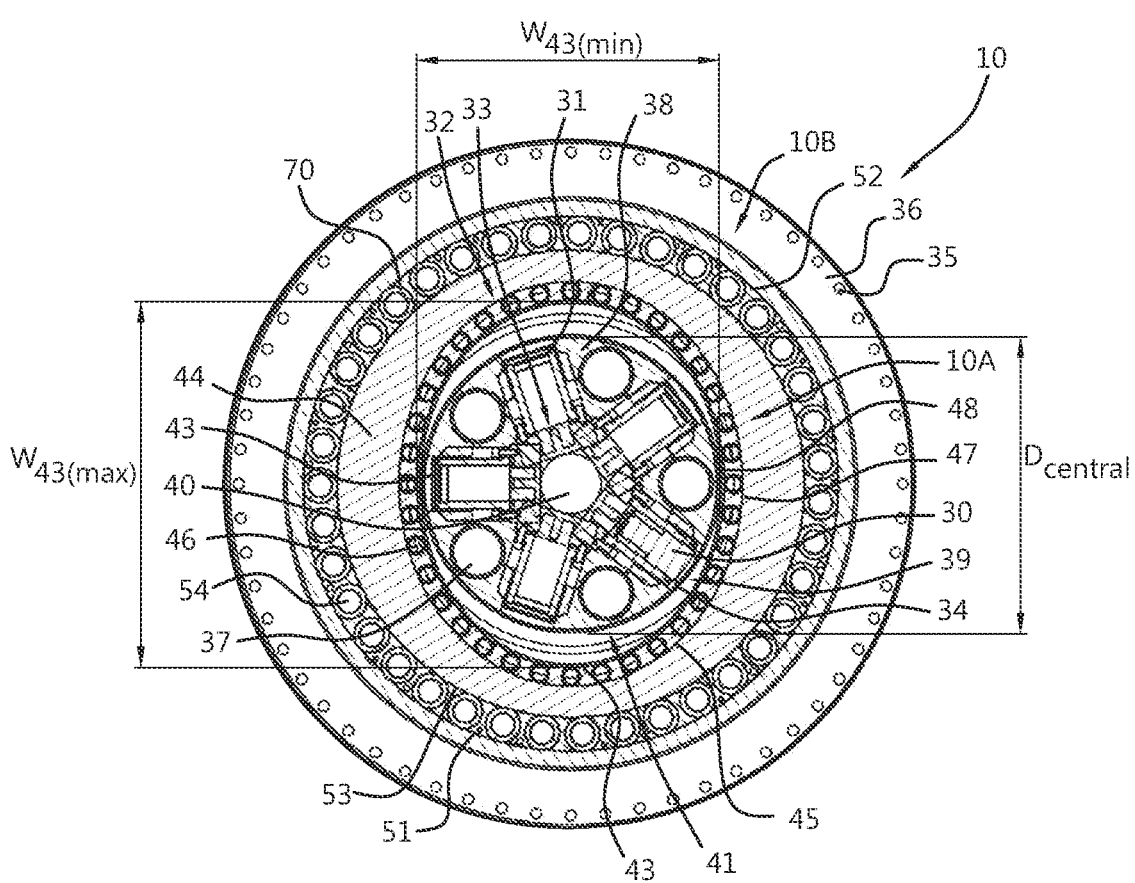
FIG. 6 illustrates a hydraulic motor according to FIGS. 4 and 5, in partial cross section along the line A-A in FIG. 4.

FIGS. 4-6 disclose schematically an embodiment of a pump 10 with an embodiment of a drive mechanism 32, by way of example. The pump comprises an inner part 10A and an outer part 10B, the outer part 10B being rotatable around the inner part 10A around a pump axis P, which in use preferably coincides with the propeller axis Y. The outer part 10A, shown circular, is provided with mounting provisions 35 for connecting it to the hub 21 of the propeller 9. Here the provisions 35 are shown as holes extending through a flange 36 for bolting the outer part 10B of the pump to the hub 21. The inner part 10A is also provided with mounting provisions 37, for mounting the inner part to the nave 16 and/or the mounting part 26 or otherwise in a position fixed relative to the housing, such that it will not rotate around the propeller axis Y when the propeller rotates around said axis Y. To this end in the embodiment shown the inner part comprises a series of holes 37 extending through a central part 38, substantially parallel to the pump axis P, through which the said central part 38 can be bolted into position.

In the central part 38 a series of cylinders 31 is provided, each having a central axis Ac extending substantially radially outward from the axis P, from a bottom end 33 to an opposite open end 39 facing outward. The inlet and outlet 11, 12 extend through the central part 38, for example through a nave 16 into the head 6 and down the tower 2. In embodiments the cylinders 31 can be integral to the central part 38. In other embodiments the cylinders can be mounted into said central part 38, for example such that they can be retracted from the central part 38 into a central opening 40 or the nave 16, for example for maintenance from within the head 6.

The central part 38 can have a substantially circular outer periphery 41 in which the open ends 39 of the cylinders lie and/or open. Pistons 30 are fitted inside the cylinders, having an end 34 reaching out of the cylinder 31 and a head 42 facing the bottom end 33 of the cylinder. A flexible lining ring or ring assembly 43 is provided extending over the ends or foot portions 34 of the pistons. The lining ring 43 can for example be a metal or plastic ring or a ring made of a compound or sandwich of layers of metal and plastic. The ring may in a relaxed position have a substantially circular cross section with a diameter $D_{liner}$ which is slightly bigger than the outer diameter $D_{central}$ of the central part 38, measured on the periphery 41, such that when the said liner ring 43 is placed around the central part 38 there will be a space between the periphery 41 of the central part 38 and the inner side of the ring 43.

A drive ring 44 is provided, having a non circular and preferably substantially elliptical central opening 45, extending around the central part and liner ring 43, such that the liner ring 43 is forced into a similar non-circular and preferably substantially elliptical shape, as for example shown in FIG. 6. Bearings 46, such as for example rollers may be provided between an outer surface 47 of the liner ring 43 and an inner surface 48 of the central opening of the drive ring 44. The configuration of the drive ring 44, liner ring 43 and bearings 46 is preferably such that the short axis or smallest width $W_{43}(min)$ of the liner ring 43 is about the same as the outer diameter $D_{central}$ of the central part 38, whereas the longer axis or largest width $W_{43}(max)$ is larger than the outer diameter $D_{central}$ of the central portion 38. In FIG. 6 the long axis $W_{43}(max)$ is shown vertically, the short axis $W_{43}(max)$ horizontally. Hence in this embodiment above and below the central portion 38 spaces 49 are provided to allow the pistons 30 in these areas to move outward, to a first end position furthest from the nave or axis P, from a second end position closest to the nave or axis P, whereas at the left and right side of the central portions the liner ring 43 is close to or even in abutment with the periphery of the central portion 38 and hence the relevant pistons 30 have been forced into a second end position, closest to the nave or axis P.

Figures 7A, 7B:
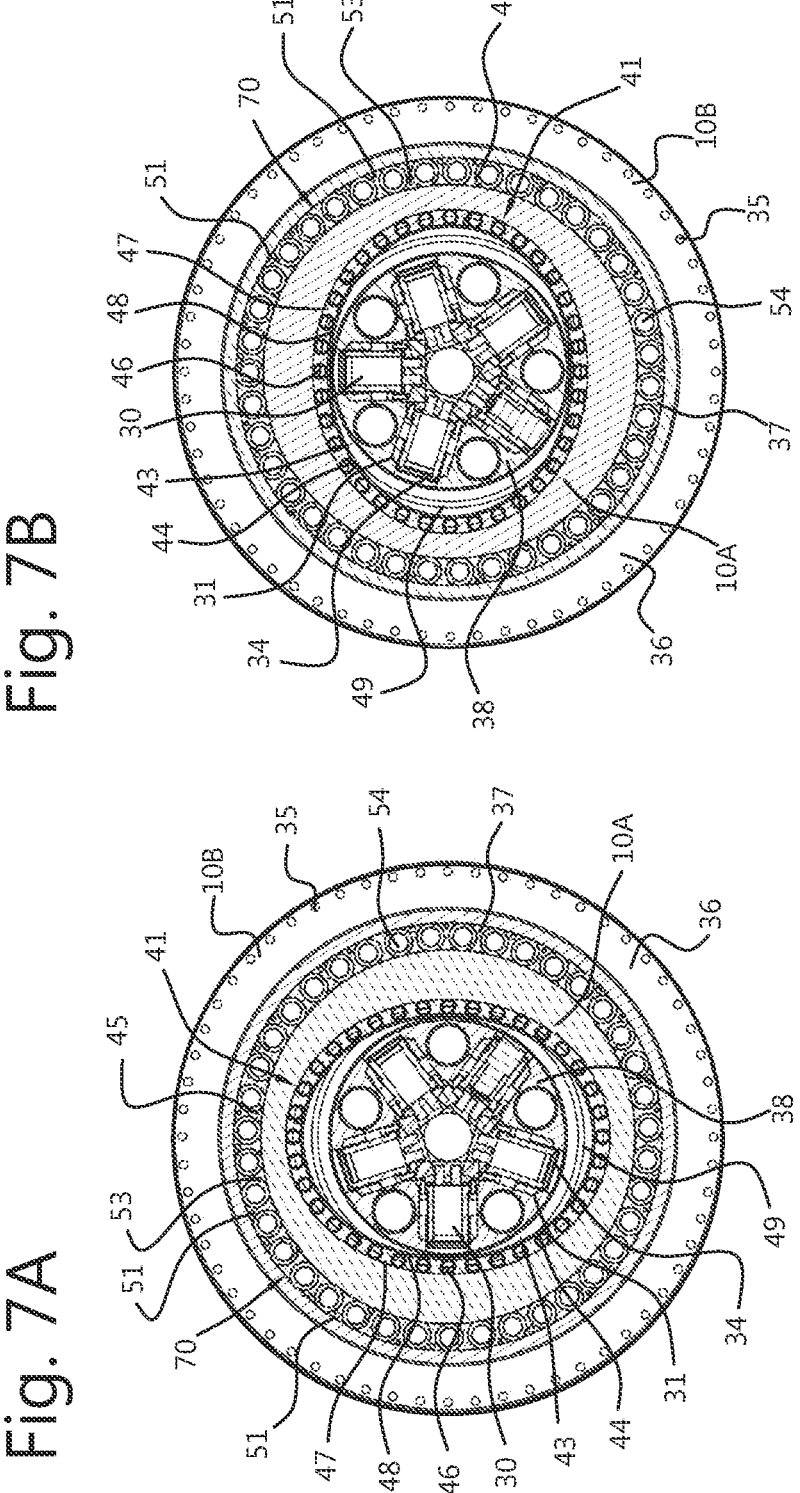
FIGS. 7A and 7B illustrate three positions of a pump according to the disclosure, especially according to FIG. 6, wherein a drive ring in FIG. 7B has been rotated over 90 degrees relative to its position in FIG. 7A.

Rotation of the drive ring 44 around the flexible liner 43, which preferably is relatively resilient, will flex the liner ring 43 such that the long axis $W_{43}(max)$ and short axis $W_{43}$ (min) will rotate around the axis P, as is schematically shown in FIGS. 7A and B. In FIG. 7A the long axis $W_{43}(max)$ extends substantially vertically, the short axis $W_{43}(min)$ substantially horizontally, whereas in FIG. 7B, in which the drive ring 54 has been rotated over an angle of about N*90 degrees around the axis P of the pump, N being an integer, and relative to the central part 38 which is held stationary. The liner ring 43 preferably is stationary too, that it does only flex but not rotate around the axis P. Hence upon rotation of the drive ring 44 the lining ring 43 is flexed, driving the pistons 30 into the respective cylinders 31. The bearings or rollers 48 will reduce friction between the drive ring 44 and the liner ring 43.

The drive ring 44 may be directly connected to or from an integral part of the outer part 10B of the pump 10 and hence will rotate with the hub 21 and propeller 9 at the same rotational speed. In embodiments the liner ring or ring assembly 43 and/or rollers 46 may be omitted, such that for example the inner surface 48 of the drive ring 44 directly engage the pistons 30 or the rollers engage the pistons 30. The pistons preferably have a slightly outward bulging spherical outer end in order to smooth the contact between the piston 30 and the drive mechanism 32.

In embodiments the drive ring 44 may form an non-circular drive for the pistons and/or cylinders, directly or indirectly engaging the pistons 30, whereas a traction and/or friction drive may be provided, engaging the drive ring 44 and the hub 21 or a part engaging the hub 21, such as for example a further ring 51, forming a gearing 70 between the hub 21 or at least the propeller 9 and the drive ring 44. Such gearing 70 can have an advantage in that it may increase rotational speed of the drive ring 44 relative to the hub 21 and/or propeller 9. Moreover, additionally or alternatively such gearing may lower torque on or from the propeller 9. Such gearing 70 may have the advantage that a relatively slowly rotating propeller 9 may provide for a relatively fast moving drive ring 44 and hence fast moving pistons 30, increasing volume of liquid to be pumped and/or pressure of liquid pumped.

In the embodiments shown gearing 70 may be provided by the drive ring 44 having an outer, circular peripheral surface 50, whereas the outer part 10B comprises an outer ring 51 with a central opening 52 provided with an inner peripheral surface 53. Between the said peripheral surfaces 50, 53 a series of bearings or rollers 54 is provided, such that upon rotation of the propeller 9 and hub 21 the bearings or rollers 54 are rotated, forming a gearing between the outer ring 51 and the drive ring 44. The gearing may be defined inter alia by the diameters of outer surface of the drive ring 44 and the inner surface of the outer ring and the diameter of the bearings or rollers 54. In embodiments the bearings or rollers can have a constant diameter. As schematically shown in FIG. 11 the bearings or rollers 54 can have a first part 54A having a diameter D54A and a second part 54B having a diameter D54B, which is smaller that the diameter D54A, thus providing for a stepped surface 55. The inner surface 53 of the outer ring 51 may for example engage the second part 54B, the outer surface 50 engaging the first part 54A. Hence a drive ration is defined between rotation of the outer ring 51, which may rotate with the propeller 9, and the drive ring 44, driving the pistons 30.

In preferred embodiments the cylinders 30 are mounted having their open ends on a circle extending symmetrically around the said nave or axis P, such that the pistons 30 can all move between first end positions furthest from the nave or axis and second end positions closest to the nave or axis, the first end positions being at equal distances from the axis or nave and the second end positions being at equal distances from the nave or axis.

In embodiments the drive ring 44 can have a central opening 45 which has an undulating inner surface 48, for example as shown in FIGS. 12 and 13, such that upon rotation of the drive ring 44 alternatingly a top 48A and a valley 48B of said surface 48 will engage a foot portion of a piston 30. Such engaging can be directly or indirectly, for example through a lining ring or ring assembly 43. In FIG. 12 the central portion 38 is shown having grooves or splices 57 extending in the axial direction of axis P, for mounting the central portion on a nave 16 with corresponding ribs (not shown), such that rotation of the central portion is prevented.

FIGS. 8 and 9A-C show an embodiment of a pump 10 according to the disclosure, which is similar to that of FIGS. 4-7. The same parts or elements have the same reference signs. In this embodiment however each piston 30 is provided, at the outward facing end or foot portion 34 at least one bearing 60 is provided, engaging the inner surface 48 of the drive ring 44. Rotation of the drive ring 44 hence again forces the pistons 30 into the cylinders 31 or allows them to be pushed outward again.

In the embodiment shown each piston 30 is provided with a bearing assembly 61, comprising at least two bearings 60, such as side by side roller bearings 60 having parallel roll axis 62, carried in a bearing holder or boogie 63. The bearing holder 63 can be mounted on the foot portion 34 of the piston 30 trough a pivot axis 64, for example extending substantially parallel to the roll axis 62 of the bearings 60. This allows the position of the bearing holder 63 relative to the piston 30 to shift corresponding to the relevant portion of the surface 48 of the drive ring 44 engaging the bearings 60.

In the embodiments of FIGS. 4-7 and of FIGS. 8 and 9 five cylinder-piston assemblies are shown, by way of example only. It shall be clear that any number of cylinder-piston assemblies can be provided, depending i.e. on the size of the cylinders and pistons 30, 31 and the available space for the pump, for example depending on an inner volume and diameter of a hub 21, head 6, size of a nave or mounting part, propeller size and the like.

In FIG. 12 it is shown that multiple parallel rows of cylinders and pistons 30, 31 can be provided. The drive mechanism 32 can be designed to drive pistons in a column parallel to the axis P simultaneously and in sync, such that they reach their end positions at the same time. However they may also be driven to reach their end positions alternatingly, such that at a given moment in time one of such pistons is moving in an outward direction $P_{out}$, when another of said pistons in such row is moving in the opposite inward direction $P_{in}$, thus at least partly compensating forces.

As is shown in FIG. 1 a wind turbine 1, especially a pump 10 of the disclosure can be connected to a generator 13 provided in a plant 14. Water is pumped from the tower 2 at relatively high pressure through a pipeline 15 to the generator 13 for driving the generator 13 and generating electrical power. In the embodiment shown the generator 13 is connected to the pipeline through a pump 60, especially through a Pelton type pump. The generator 13 may be a multiple drive generator 13, wherein a first drive is provided by said pump 60 and a second drive is provided by a further type drive 61. Such second type drive 61 may for example be an incinerator type drive, such as for example a fossil fuel drive or an earth heat driven drive, tidal drive, solar powered drive or waste heat driven drive or the like.

Instead of connecting the pipe line 15 directly to a generator 13, water pumped by the pump 15 can be stored in a storage system, for example a water tank or basin, or such reservoir, for driving a generator such as a turbine by again releasing the water from such reservoir. Alternatively the water pumped can be used for other purposes.

In embodiments a wind turbine, for example as discussed here before, can be provided with a crane 100 for lifting the propeller 9 or at least the hub 21 and/or the pump, preferably the hub 21 with the pump 10 or parts thereof. In the embodiment shown the crane 100 can be mounted on the head 6, especially on a top side 101 thereof. A crane 100 can for example have a foldable and/or telescoping arm 102, such that a free end 103 thereof can be moved between a first position, shown in FIG. 14, moved away from above the hub 21 of the propeller 9 and a second position, shown in FIG. 15, in which said free end 103 is positioned above the hub 21. A hoisting line 104, for example a cable or chain, can be connected to the hub 21 of the propeller 9, such that the crane 100 can bear the weight of the propeller 9, after which the propeller can be released from the head 6 and can be lowered, for example to the ground or water level or a vessel or the like, for transport, inspection, maintenance, repair or other handling of the propeller or parts thereof, for example a pump 10 or part thereof, if provided for. Similarly the propeller 9 can be lifted upward to the head using the crane 100. In the embodiment shown the crane 100 is pivotable relative to the head 6, such that it can be stored in a retracted and/or folded in position, for example a position against an outer surface of the head or in a storage bay or other such provision 105.

By providing a crane 100 the need for heavy equipment to be brought to and from the wind turbine, such as floating docks, cranes and the like is prevented.

For hoisting parts of a wind turbine with the crane 100 also other provisional can be connected to the line 104, such as but not limited to a hoisting basket, magnet or the like, for holding and/or containing said parts.

FIG. 16 schematically shows different steps of dismounting and mounting a propeller 9 or at least a hub 21 of a propeller 9 of a wind turbine 1. This may or may not include part of or an entire hydraulic pump 10 as discussed.

In this embodiment the hub 21 is connected to the head 6 by a mounting part 26. The mounting part 26 can for example be angular, such that a first part 26A extends below the head 6 and a second part 26B extends in front of the head 6. Appropriate bearings are provided (not shown) for mounting the hub 21 and hence the propeller 9 to the mounting part 26, especially to the second part 26B such that the propeller in use can rotate around the propeller axis Y. The mounting part 26 can be connected for example by bolting it to the head, bolts indicated by reference signs 26C, preferably accessible from inside the head 6.

When the propeller 9 has to be removed, the hoisting line 104 can be connected to the hub 21 and/or the mounting part 26 in an appropriate manner, where after the mounting part 26 can be released from the head 6. Then the hub 21 with the mounting part and if appropriate the blades 22 can be lowered along the tower 2 onto for example a platform 105 at the foot of the tower 2. In off shore applications the platform 105 may for example be a motion compensating platform as known from Ampelmann, The Netherlands on a vessel 106. Then the hub 21 and/or mounting part 26 can be released from the hoisting line 104 and be brought to a different location, can be serviced, inspected or otherwise handled, for example cleaned. After the appropriate handling the hub with the mounting part 26 can again be hoisted up to the head, to be refitted. Alternatively the hub 21 and/or the mounting part 26 can be exchanged for another hub 21 and/or mounting part 26, the original part(s) being serviced or discarded.

In embodiments a series of wind turbines 1 can be provided, for example in a wind farm, for example N wind turbines, whereas at least one spare propeller 9 and/or hub 21 and/or pump 10 is provided, i.e. there are at least N+1 propellers, hubs and/or pumps available for said wind farm. This means that at any time a propeller, hub and/or pump can be removed from a wind turbine 1 and replaced by the spare one, which can then be serviced, for example on site. The down time for the wind turbines in such wind farm can thus be limited considerably.

FIG. 17 shows a story board for an embodiment of a method of the disclosure, in sixteen images. This is only discussed by way of example and should by no means be understood as limiting the scope of the present disclosure. In this embodiment an off shore wind farm 110 is serviced, using a vessel 106 with a motion compensation platform 105, such as an Ampelmann system.

After briefing personnel and on-shore preparations (step 1) the vessel 106 will take personnel and equipment to the windfarm (step 2) and personnel will change into appropriate gear, such as personnel protection equipment (PPE) (step 3). Personnel 107 is dropped off at a wind turbine 1 according to the disclosure (step 4), preferably using the platform 105. In the wind turbine preferably a control system 108 is provided with which a maintenance mode can be switch on (step 5) by which at least the propeller 9 is brought into a safe position for maintenance. Then personnel 107 goes up to the head 6 by an elevator or stairs, preferably inside the tower 2 to access the head or nacelle (step 6) and allowing personnel access to the crane 100. The crane 100 can be activated, such that it is brought into an extended position for attaching the hoisting line 104 to the propeller 9, especially the hub 21 and/or a mounting part 26 (step 7). Then the propeller 9 and the mounting part 26, also referred to as DOT system 111, can be released from the head 6 (step 8) such that it can be lowered to the platform 105 using the crane 100 (step 9). A spare DOT system 111 can be placed on the platform 105 or at least be hoisted up to the head using the crane 100 (step 10) to be attached to the head 6 (step 11). Then the hoisting line 104 can be released from the DOT system 111 and the crane 100 be brought back in the storage position, after which the personnel 107 can go back down through the tower 2 (step 12) and the maintenance mode can be deactivated (step 13) such that the wind turbine can be operative again. The personnel can be picked up by the vessel 106, preferably using the platform 105 again (step 14). The DOT system 111 removed can for example be serviced on board of the vessel 106 (step 15) whereas the vessel 106 can sail to the next wind turbine 1 in the wind farm, using the DOT system 111 on board as a spare for said next wind turbine, starting a next cycle at step 4 as discussed before, preferably repeating the process until all wind turbines in the wind farm have been serviced.

FIG. 18 schematically shows a story board for maintenance performed on a wind turbine 1, especially a pump 10 thereof, which may be done from within the head 6 or for example on a vessel 106 in step 15 as discussed with reference to FIG. 17. FIG. 18 schematically shows ten steps in such maintenance. First appropriate tools and spare parts, for example gaskets are collected (step 15.1) after which personnel will access the pump 10, for example through the central opening in the central part 38 of a pump 10 as discussed previously (step 15.2). To this end the DOT system 111 may for example be placed substantially horizontally, a nose 21A of the hub 21 facing upward. Then a manifold 112, comprising for example inlet 11 and outlet 12 connections, may be released (step 15.3) after which it may be removed (step 15.4). Then the relevant cylinder 31 may be removed and/or the relevant piston 30 may be taken out of the cylinder 31 (step 15.4) for example for inspection of and, if necessary, replacement of the gaskets 30A (step 15.5), after which the piston 30 and/or cylinder 31 can be re-installed (step 15.6). Then the manifold 112 can be replaced (step 15.7) and be bolted back in position (step 15.8) and properly connected. The steps 15.3-15.8 can be repeated for all cylinders 31 of the pump 10. Then, after gathering the tools (step 15.9) the personnel can leave the DOT system 111 again (step 15.10) and the pump 10 is ready for instalment in the same or another wind turbine.

FIG. 19 shows an alternative use of a wind turbine 1 of the disclosure, in which the pump 10 is integrated in a closed circuit for a first fluid, for example oil. The pump 10 is provided, as discussed, at least partly and preferably substantially entirely in the hub 21 of the propeller 9. A motor 113 is provided in or near the tower 2, for example at a foot 114 of the tower 2. A first, low pressure line 115 extends from the motor 113 up to the pump 10, especially the inlets 111 thereof, whereas a second, high pressure line 116 extends from the pump 10, especially the outlets 12 thereof, down to the motor 113. The first fluid is hence pumped up to the pump 10, where the pressure is increased by the pump 10 driven by the propeller 9. Then the high pressure fluid forced down drives the motor 113. The motor 113 drives a second pump 117, for example a salt water pump, which can pump water, for example collected from the body of water 5 in which the wind turbine is placed, to a generator 13, for example on a platform central to a wind farm. The generator 13 can be driven by the sea water pressurised by the second pump 117. In such embodiment the pump 10 need not be salt water compatible.

FIG. 20 shows schematically, in perspective view, part of a wind turbine 1, with a partly broken away head 6, showing a pump 10 with partly broken away housing, and a combined inlet line 11 and outlet line 12.

FIGS. 21 and 22 show in cross sectional side view part of a pump 10, partly broken away. As can be seen in FIGS. 21, 22 and e.g. FIG. 4 the pump 10 can be substantially mirror symmetrical over a plane A-A as shown in FIG. 4, extending perpendicular to the rotation axis P of the pump and/or the propeller axis Y.

In FIG. 21 a single row embodiment is shown, that is an embodiment of a pump 10 with a single row of cylinders 31 with pistons 30. Each piston comprises a boogie 63 with bearings 60 carried on a piston foot 34, running against an inner surface 48 of the drive ring 44. In FIG. 22 an embodiment is shown in which two parallel rows of cylinders 31 with pistons 30 is provided. As can be seen in FIG. 22 especially the outer ring or rings 50 can be connected to the propeller 9, partly shown to the right in FIG. 22, through a hub 21. Thus upon rotation of the propeller 9 the hub 21 will rotate around the propeller axis Y, rotating the ring or rings 50 and hence the drive ring 44, through gearing 70. This in turn drives the pistons for pumping.

As can be seen in FIG. 22 each row R of cylinders 31 and pistons 30 can be formed by basically a pump 10 as shown in FIG. 21, such that a pump 10 can be modular, wherein each module M can for example comprise one row R, outer rings 50 being connected to each other directly and/or through the hub 21. Hence scaling is easily possible. In embodiments a clutch can be provided between all or some of the modules M, allowing some or all of the modules M in a pump 10 to be used, depending on for example wind available for driving the propeller.

Figure 8A:
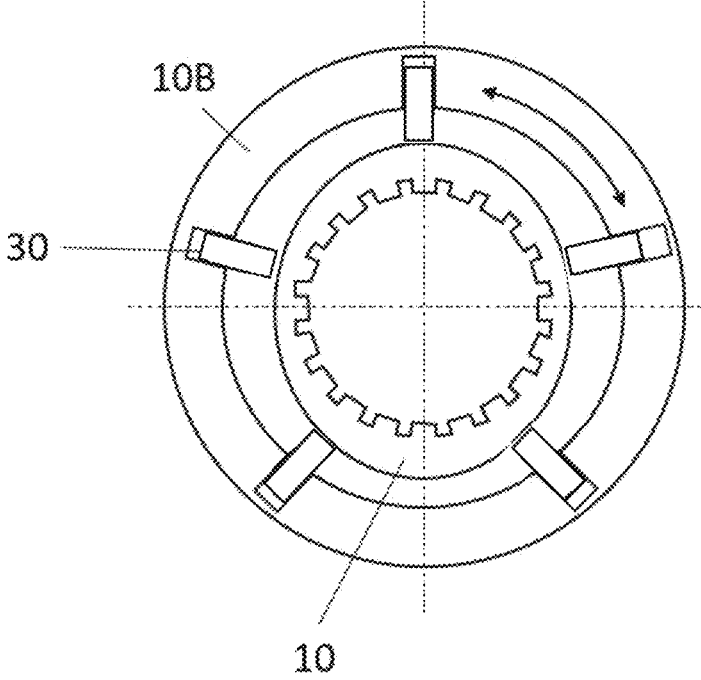
FIG. 8A illustrates another embodiment of a hydraulic pump, in cross sectional side view.

The invention is by no means limited to the embodiments specifically disclosed and discussed here above. Many variations thereof are possible, including but not limited to combinations of parts of embodiments shown and described. For example the cylinders and pistons 31, 30 can be provided in the drive ring, facing radially inward, wherein the central portion is used to drive the pistons in a radial direction, relative to the pump axis (see, e.g., FIG. 8A, FIG. 12A). In such embodiment it may be preferable to connect the central portion 38 to the hub 21 of the propeller 9 and mount the drive ring stationary on a mounting part 26. Also combinations are possible of cylinders in the drive ring and cylinders in the central portion. A mounting part may be a separate part or may be a part of the head 6. As discussed different types of pumps 10 can be used, such as but not limited to centrifugal pumps, a pump using a planetary traction or friction drive or an axial pump as known in the art. Such pump is mounted in the propeller 9, especially in a hub 21 thereof, such that the pump can be removed from the head 6 together with the propeller 9. In embodiments a crane can be provided in a different position, for example in the head 6 or on the tower 2.

These and many other amendments are considered to have been disclosed herein also, including but not limited to all combinations of elements of the invention as disclosed, within the scope of the invention as presented.

The invention claimed is:

1. A wind turbine, comprising a tower and a head mounted at an upper end of said tower, the head being rotational around a head axis, wherein a propeller is mounted to said head, the propeller being rotatable around a propeller axis, wherein the propeller comprises a hub, wherein a hydraulic pump is provided and configured to be driven by said propeller, wherein the hydraulic pump is provided in the hub of the propeller such that the hydraulic pump is configured for removal from the head together with the propeller, wherein the head is provided with a nave, wherein a movable part of the hydraulic pump rotates with the propeller around a part of said nave, wherein said nave forms or is provided with a stationary part of the hydraulic pump, and wherein the propeller comprises a rotational part of the hydraulic pump, and wherein said nave comprises a first part inside said head and a second part which is releasably connected to said first part, wherein said second part is provided in or by said hydraulic pump.

2. The wind turbine according to claim 1, wherein a fluid circuit extends through the tower and the head, which fluid circuit comprises a part extending inside the hub of the propeller, which part comprises at least part of the hydraulic pump.

3. The wind turbine according to claim 2, wherein the fluid circuit comprises at least one valve provided in or near the head for disconnecting a fluid inlet channel of said fluid circuit from the hydraulic pump, and further provided with at least a second valve in or near the head for disconnecting an outlet channel of said fluid circuit from the hydraulic pump.

4. The wind turbine according to claim 1, wherein the hydraulic pump is a multi-piston pump, comprising a central part and a drive ring extending around the central part, wherein:

the central part comprises a series of radially outward facing cylinders with pistons movable in said cylinders in a radial direction, relative to a central axis, wherein the drive ring is configured to engage the pistons directly or indirectly for at least forcing the pistons radially inward.

5. The wind turbine according to claim 1, wherein the hydraulic pump is a multi-piston pump, comprising a central part and a drive ring extending around the central part, wherein the drive ring comprises a series of radially inward facing cylinders with pistons, wherein the central part is configured to drive the pistons radially relative to a central axis, and wherein the drive ring comprises an inward facing, non-circular surface, engaging the pistons directly or indirectly.

6. The wind turbine according to claim 5, wherein between the inward facing, non-circular surface of the drive ring and the pistons, a flexible ring or ring assembly is provided that is configured to flex upon rotation of the drive ring, for driving the pistons.

7. The wind turbine according to claim 5, wherein between the inward facing, non-circular surface of the drive ring and each piston, at least two bearings are provided, carried by a boogie, for driving the pistons upon rotation of the drive ring.

8. The wind turbine according to claim 1, wherein the hydraulic pump is mounted to the head using a mounting provision also supporting the propeller, wherein the hub has one or more blades connected thereto, wherein the hub is mounted on at least one bracket which extends from the hub, which bracket is releasably connected to the head.

9. The wind turbine according to claim 1, wherein the hub has one or more blades connected thereto, wherein the hub is mounted by at least one gear and/or a bearing, such that the hub can rotate relative to the head by said at least one gear and/or said bearing.

10. The wind turbine according to claim 1, wherein the hydraulic pump comprises a non-circular drive for radially extending pistons and/or cylinders, directly or indirectly engaging said pistons and/or cylinders, and wherein a traction drive and/or a friction drive is provided, engaging said non-circular drive and the hub of the propeller, or a part engaging such hub, forming a gearing between the hub or at least the propeller and the non-circular drive.

11. The wind turbine according to claim 1, wherein a crane is mounted to the head or provided by the head, with which the propeller can be lifted from the head to a position near a foot of the tower or vice versa, wherein the crane is provided on a top side of said head.

12. The wind turbine according to claim 11, wherein the crane is provided for lifting the propeller with at least part of the hydraulic pump.

13. The wind turbine according to claim 1, wherein the propeller with the hydraulic pump or at least a part thereof provided in or by the propeller is exchangeable for a replacement propeller with hydraulic pump or the part thereof.

14. The wind turbine according to claim 1, wherein the hydraulic pump or the part thereof provided by or inside the propeller is accessible from within the head.

15. The wind turbine according to claim 1, wherein the hydraulic pump is connected to a generator, through a hydraulic motor.

16. The wind turbine according to claim 15, wherein the generator is a multiple drive generator, wherein a first drive is provided by said hydraulic pump and a second drive is provided by one of the group consisting of: an incinerator type drive, a fossil fuel drive an earth heat driven drive, a tidal drive, a solar powered drive and a waste heat driven drive.

17. System for installation and/or maintenance of the wind turbine according to claim 1, wherein the system comprises at least one vessel provided with a movable, motion compensating platform suitable for carrying a propeller system of the wind turbine, wherein the platform is further suitable for transferring personnel to and from a wind mill to which the propeller system is to be mounted or from which the propeller system is to be retrieved.

18. A method for installing and/or maintenance of the wind turbine according to claim 1, wherein the tower with the head is placed in a selected position, and a propeller system is shipped to said tower, the propeller system including the hydraulic pump provided in the hub of the propeller, wherein the propeller system is lifted to the head such that the hydraulic pump is configured to be assembled in the wind turbine and/or configured to be connected to a hydraulic circuit extending through the tower and the head.

19. The method according to claim 18, wherein the propeller system is configured to be first removed from the head and is then replaced by a replacement propeller system.

* * * * *